United States Patent
Syrjarinne et al.

(10) Patent No.: US 9,852,456 B2
(45) Date of Patent: Dec. 26, 2017

(54) LOCATION SERVICE SELECTION APPARATUS AND METHODS

(75) Inventors: Jari Syrjarinne, Tampere (FI); Altti Jokinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 570 days.

(21) Appl. No.: 13/141,302

(22) PCT Filed: Dec. 17, 2009

(86) PCT No.: PCT/EP2009/009076
§ 371 (c)(1),
(2), (4) Date: Jun. 21, 2011

(87) PCT Pub. No.: WO2010/072369
PCT Pub. Date: Jul. 1, 2010

(65) Prior Publication Data
US 2011/0258580 A1    Oct. 20, 2011

(30) Foreign Application Priority Data
Dec. 22, 2008  (GB) .................................. 0823333.0

(51) Int. Cl.
G06F 3/048  (2013.01)
G06Q 30/06  (2012.01)
H04M 3/42   (2006.01)

(52) U.S. Cl.
CPC ............. *G06Q 30/06* (2013.01); *G06F 3/048* (2013.01); *H04M 3/42161* (2013.01); *H04M 3/42348* (2013.01); *H04M 2250/10* (2013.01)

(58) Field of Classification Search
CPC ........................... G06F 3/048; H04M 3/42348
(Continued)

(56) References Cited

U.S. PATENT DOCUMENTS 6,400,946 B1    6/2002  Vazvan
7,212,810 B2 *  5/2007  Babbar et al. ............. 455/414.1
(Continued)

FOREIGN PATENT DOCUMENTS

EP    2232291      9/2010
WO    WO0203093    1/2002
(Continued)

OTHER PUBLICATIONS

English language machine translation of International Patent Publication No. WO2009/080932, 14 pages.
(Continued)

*Primary Examiner* — Xuyang Xia
(74) *Attorney, Agent, or Firm* — Locke Lord LLP

(57) ABSTRACT

Apparatus comprising one or more processors configured to provide a user with location service selection criterion signalling. The location service selection criterion signalling allows for user selection of one or more differing types of location service, wherein each of the differing types of location service are for the provision of location related data for the apparatus. The apparatus also comprises one or more inputs configured to receive user selection criterion signalling representative of user input responsive to said location service selection criterion signalling, and one or more processors configured to allow for use of the user selection criterion signalling to select one or more differing types of location service in the provision of location related data for the apparatus.

16 Claims, 5 Drawing Sheets

(58) Field of Classification Search
USPC .......................................................... 715/810
See application file for complete search history.

(56) References Cited

U.S. PATENT DOCUMENTS

| | | | |
|---|---|---|---|
| 7,245,913 B1* | 7/2007 | Nguyen et al. | 455/435.2 |
| 2002/0039892 A1* | 4/2002 | Lindell | 455/151.1 |
| 2002/0068549 A1 | 6/2002 | Tendler | |
| 2002/0087674 A1 | 7/2002 | Guilford | |
| 2004/0172191 A1* | 9/2004 | Vitikainen et al. | 701/208 |
| 2004/0266454 A1 | 12/2004 | Nielsen | |
| 2005/0136895 A1* | 6/2005 | Thenthiruperai | H04W 64/00 455/412.2 |
| 2006/0030337 A1* | 2/2006 | Nowak | 455/456.2 |
| 2007/0006098 A1* | 1/2007 | Krumm | G06F 17/3087 715/825 |
| 2007/0265775 A1* | 11/2007 | Tsai et al. | 701/213 |
| 2008/0293436 A1* | 11/2008 | Fok et al. | 455/456.2 |
| 2009/0192709 A1* | 7/2009 | Yonker | G01C 21/20 701/470 |
| 2010/0265060 A1 | 10/2010 | Watt | |

FOREIGN PATENT DOCUMENTS

| | | |
|---|---|---|
| WO | WO 0203093 A1 | 1/2002 |
| WO | WO2009003293 | 1/2009 |
| WO | WO 2009003293 A1 | 1/2009 |
| WO | WO2009080932 | 7/2009 |

OTHER PUBLICATIONS

PCT International Search Report and Written Opinion for International Application No. PCT/EP2009/009076, dated Mar. 5, 2010.
GB Search Report for GB Application No. 0823333.0, dated Apr. 8, 2009.
EP Communication dated Mar. 24, 2015 for European Patent Application No. 09801164.6, 5 pages.

* cited by examiner

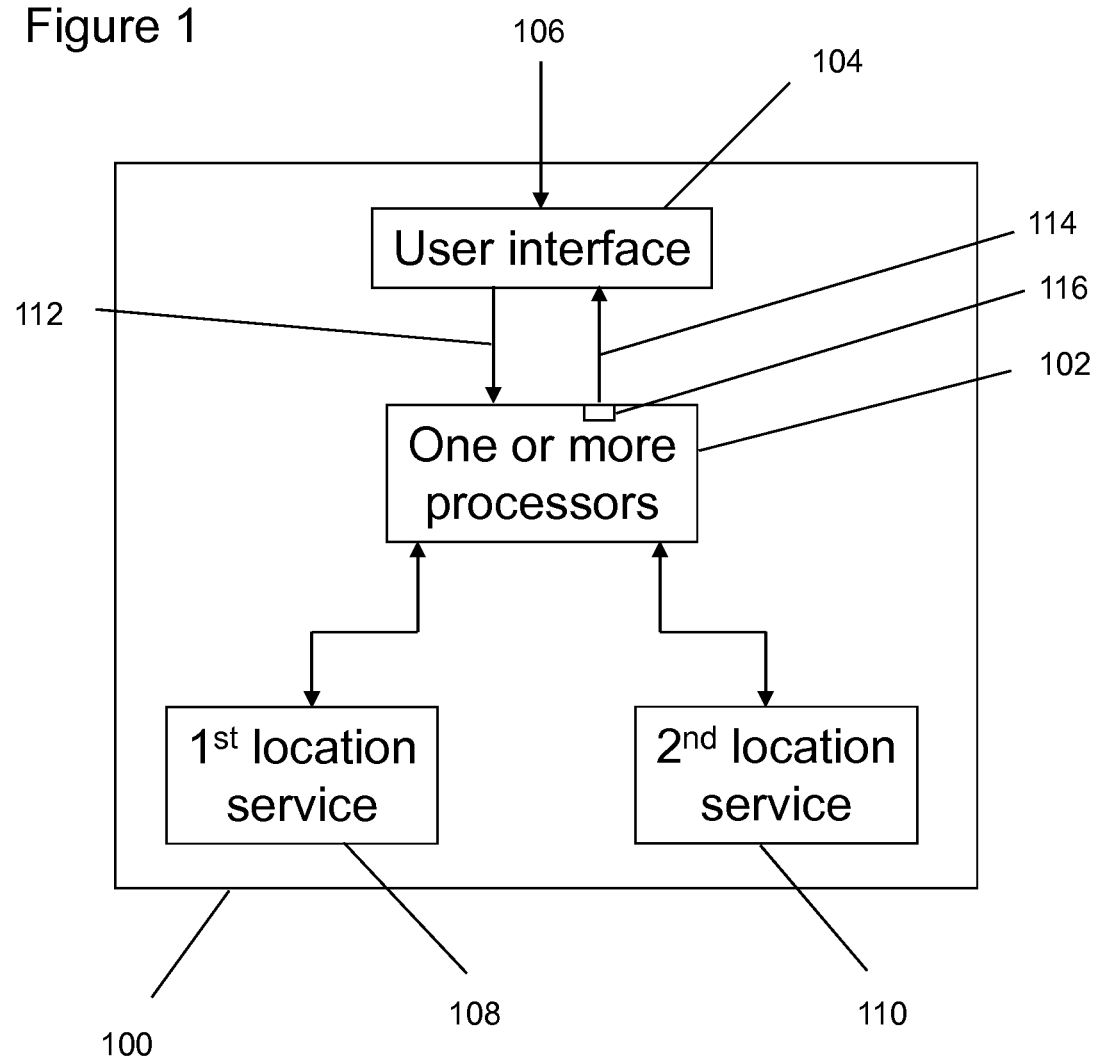

LOCATION SERVICE SELECTION APPARATUS AND METHODS

TECHNICAL FIELD

The present disclosure relates to the field of location services, and more particularly to the provision of one or more of a plurality of available location services, associated methods, computer programs and apparatus.

Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Global positioning systems (GPS) are becoming mainstream technologies in a wide range of electronic devices, including mobile telephones. In some cases, the GPS technologies are used for personal navigation. In many of these devices, the GPS may be either "on" or "off". In addition, one or more alternative location services may be available such as those that utilise wireless local area network (WLAN) location beacons.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided apparatus comprising:
one or more processors configured to provide a user with location service selection criterion signalling, the location service selection criterion signalling allowing for user selection of one or more differing types of location service, each of the differing types of location service for the provision of location related data for the apparatus;
one or more inputs configured to receive user selection criterion signalling representative of user input responsive to said location service selection criterion signalling; and
one or more processors configured to allow for use of the user selection criterion signalling to select one or more differing types of location service in the provision of location related data for the apparatus.
The one or more processors may be the same or different processors.

Providing the user with location service selection criterion signalling can enable a user to make an informed decision as to which of the one more differing types of location service to use. The location service selection criterion signalling may provide information that is readily understandable to the user, and may conceal any technical details relating to the location services that the user may not understand. In some embodiments, the names of the types of location service, such as GPS, may be concealed from the user.

Embodiments of the invention may concern the presentation in a simplified manner of the complex issues covering a collection of location services that could be available to the user at any point in time. This simplification can be used to present the intangible items such as service cost directly or indirectly to a user based on such things as data traffic needed, battery consumption of differing options and also the selection can be based on the user needed accuracy at any time.

Embodiments of the invention may be used with a "location awareness profile" of a device that is used to determine a location service provider identified by the location awareness profile. The location awareness profile may be static or may dynamically change over time in accordance with one or more external factors. The device may continuously, or be configured to selectively, determine its location. The determined location may be used by one or more application programs associated with the device, such as for navigation, location tagging of pictures, finding friends that are in the vicinity of a current location, recording location history and location based advertising.

The location service selection criterion signalling may represent one or more operational parameters and/or one or more performance characteristics of the location services. The operational parameters of the location services may be used to hide the selected location service and hide the use of the location technology that may be used by an application program that utilises location awareness of the user.

The location service selection criterion signalling may represent one or more performance characteristics of the apparatus and/or a device associated with the apparatus.

Utilising location service selection criterion signalling that represents performance characteristics of the location services and/or the apparatus and/or a device associated with the apparatus, can allow a user to make an indirect decision as to which location service to use based on parameters that effect how they can use a device associated with the apparatus.

The location service selection criterion signalling may represent one or more costs associated with differing types of location service, and the costs may include one or more of: power consumption; accuracy; and monetary value. One or more of the costs may also be considered as performance characteristics.

In some embodiments, the costs of using each of the location services may be an important consideration for a user. It will be appreciated that the term "costs" does not only include monetary costs, and can include performance costs of a device/apparatus such as battery life, processing speed, available computer memory, available bandwidth for communication, and can also include performance costs of the location service such as accuracy and reliability.

The location service selection criterion signalling may be configured to allow a user to vary a desired value for one or more of the performance characteristics and display information indicative of how such a variation affects other performance characteristics.

In this way, a user can be provided with an element of control over the information displayed to them when selecting (in some embodiments, indirectly) which locations service to use.

The user selection criterion signalling may be representative of user input indicative of one or more desired values for a performance characteristic. The one or more processors may be configured to process user selection criterion signalling and generate revised location service selection criterion in accordance with user input indicative of a change in a desired value of one or more of the performance characteristics.

The differing types of location service may comprise one or more of a global positioning system (GPS), assisted global positioning system (A-GPS), mobile telephony cell-based location services; wireless networking applications (such as Wi-Fi, time difference processing, time of arrival processing, triangulation); high accuracy GPS; Global Navigation Satellite System (GNSS) which may refer to one or any combination of the following satellite systems: GPS, GLONASS, Galileo, Quazi-Zenith Satellite System (QZSS), Satellite Based Augmentation System (SBAS), Compass, Beidou or Indian Regional Navigation Satellite System (IRNSS); and motion sensors (such as accelerometers, gyroscopes, barometers).

It will be appreciated that different location services have different qualities and performance levels, and that some location services are more suitable for certain situations/circumstances than others.

Applications like location tagging of pictures, finding local friends, location history and location based advertising are examples that require location information, but do not necessarily require very accurate location information, such as at the GPS/A-GPS grade. In these use cases it may be that availability (or coverage) of the location information is more important than the accuracy of the location. For example, whenever a user takes a picture, location information should be available even though the picture was taken indoors or even outside the network coverage.

Location Awareness can be a challenging feature from power-consumption, positioning accuracy and cost point of views. In order to maintain good positioning accuracy, for example for instantaneous navigation or push-to-fix cases, use of the GPS should be prioritized. However, a GPS receiver can consume a lot of power, especially indoors, or does not even work in all environments, which not only means breaks in the availability of location information but also that a Location Aware solution based on GPS will quickly drain the battery making GPS receiver impractical for this purpose.

Another aspect related to GPS is the possible use of network assistance data. A-GPS relies on the network assistance improving signal acquisition and navigation data reception capabilities and in the near-future the network assistance might even enable sub-meter accuracy using carrier-phase assistance etc. which will mean costs to the users and increased power consumption due to the use of data connection (general packet radio service (GPRS), high speed packet access (HSPA) etc.). As a result, despite its superior accuracy A-GPS may be available/practical either for the Location Aware solution which needs to be active continuously as a background process. Hence, any working solution for Location Awareness can be based on a mixed/hybrid use of a number of different location technologies (GPS, A-GPS, High-accuracy GPS, Cell-ID, Wi-Fi, motion sensors, etc.) used in an advantageous way.

In contrast, navigation application programs may require more accurate location information. Embodiments of the invention can enable a user to select which of a plurality of location services to use, and in some embodiments, the selection is based (at least in part) on performance characteristics of the available location services.

Embodiments of the invention can provide apparatus having continuous location availability information, and in mobile telephone examples a location technology module/solution may be provided in a handset that is continuously aware of its own location, that is, it is location aware.

The location service selection criterion signalling may represent operational parameters that are specific to a mode of operation of a device associated with the apparatus. For example, connections using different communication channels such as second generation (2g), third generation (3g), WLAN, Wi Fi, GPRS or High Speed Packet download services may use different amounts of power.

In another example, if the apparatus is associated with a battery powered device, such as a mobile telephone, and the mobile telephone is connected to a mains supply for charging the mobile telephone, then performance parameters relating to power consumption may not be taken into account by the one or more processors when generating the location service selection criterion signalling. That is, the apparatus does not consider the effects on battery life when the device is being charged as it is not relying on the battery for power.

The one or more processors may be configured to select one or more differing types of location service by sending authentication to a location service provider. In some embodiments, provision of location related data may be provided by a location service provider that is local to, or remote from, the apparatus. The apparatus may be in communication with a remote location service provider over a network.

The one or more processors may be configured to select one or more differing types of location service by activating one or more location service applications.

The apparatus may be configured to provide a user with location service criterion signalling when the operational status of a location service changes. This enables an efficient use of location services to be used as the user has an opportunity to change their selection when the status of a location service changes. For example, user input may be requested when a location service becomes available or unavailable, or when a parameter changes that effects the costs of that service.

The apparatus may comprise one or more inputs configured to receive signalling representative of an operational state of a device associated with the apparatus, and the one or more processors may be configured to provide a user with location service criterion signalling when the operational status of the device changes. For example, when a device's battery is running low, or when it is plugged into a charger, user input may be requested to confirm that they want to continue to use the location service currently in use or change to one or more different location services in light of the operational state change of the device.

The one or more processors may be configured to change the selection of one or more differing types of location service in the provision of location related data if one or more parameters associated with the location service, or a device associated with the apparatus, changes.

The change in selection may be automatic without requiring user input. This can enable the automatic updating of the location service that is being used by an apparatus based on the user's initial selection and optionally one or more default settings.

In some embodiments, the change of location service may be semi-automatic. This may mean that the change of location service is made automatically by the apparatus and user input is requested to accept or reject the change. In other embodiments a recommended change of location service is provided to a user, for example by the one or more processors generating further location service selection criterion signalling, but the change is not made until the user accepts the change. In some embodiments, the processor can cause information relating to the change to be displayed to the user.

The user interface may be displayed to a user (pop-up) when: the user roams out of a network, when the cost and availability of the Location Awareness might drastically change, the user loses network coverage, which can affect the quality and availability of the location awareness, battery is almost empty to warn the user for the consequences of the continued use of location awareness, or the handset is disconnected from a power supply which will change the expected life-time, as non-limiting examples.

According to a further aspect, there is provided a device comprising an apparatus, the apparatus comprising:
  one or more processors configured to provide a user with location service selection criterion signalling, the location service selection criterion signalling allowing for user selection of one or more differing types of location service, each of the differing types of location service for the provision of location related data for the apparatus;
  one or more inputs configured to receive user selection criterion signalling representative of user input responsive to said location service selection criterion signalling; and
  one or more processors configured to allow for use of the user selection criterion signalling to select one or more differing types of location service in the provision of location related data for the apparatus.

The location service selection criterion signalling may represent one or more performance characteristics of the apparatus.

The device may be a mobile telephone, a personal digital assistant, a navigation unit, such as a satellite navigation unit, or any other electronic device that is configured to provide location aware services/applications. The device may be battery powered.

According to a further aspect, there is provided a module for a device, the module comprising an apparatus, the apparatus comprising:
  one or more processors configured to provide a user with location service selection criterion signalling, the location service selection criterion signalling allowing for user selection of one or more differing types of location service, each of the differing types of location service for the provision of location related data for the apparatus;
  one or more inputs configured to receive user selection criterion signalling representative of user input responsive to said location service selection criterion signalling; and
  one or more processors configured to allow for use of the user selection criterion signalling to select one or more differing types of location service in the provision of location related data for the apparatus.

The location service selection criterion signalling may represent one or more performance characteristics of the apparatus.

According to a further aspect, there is provided a user interface having a display and one or more user inputs, the user interface configured to:
  receive location service selection criterion signalling, and display information representative of the location service selection criterion signalling on the display to enable user selection of one or more differing types of location service, each of the differing types of location service for the provision of location related data for the apparatus;
  receive user input responsive to said location service selection criterion signalling from one or more of the inputs; and
  provide user selection criterion signalling in accordance with the user input.

The user interface can be convenient for a user to be able to select one of a plurality of location services in response to the received location service selection criterion signalling.

The user interface may be a graphical user interface (GUI), which may be displayed on a touch sensitive display screen.

The location service selection criterion signalling may represent one or more performance characteristics of the apparatus. The user interface may be configured to display one or more performance characteristics/costs associated with differing types of location service derived from the location service selection criterion signalling, and the costs may include one or more of: power consumption; accuracy; and monetary value. Also there can be some other settings, for example: a consideration as to whether the navigation mode is optimized for car or pedestrian navigation.

The user interface may be configured to display user selectable values for one or more performance characteristics of the apparatus in accordance with the received location service selection criterion signalling. For example, the user interface may be configured to display a range of values for a performance characteristic. The user interface may be configured to provide the user selection criterion signalling in accordance with the user input such that revised location service selection criterion signalling is receivable in accordance with a user selection of a value for one or more of the performance characteristics.

According to a further aspect, there is provided a method of selecting one or more differing types of location service in the provision of location related data for an apparatus, the method comprising:
  providing a user with location service selection criterion signalling, the location service selection criterion signalling allowing for user selection of one or more differing types of location service, each of the differing types of location service for the provision of location related data for the apparatus;
  receiving user selection criterion signalling representative of user input responsive to said location service selection criterion signalling; and
  allowing for use of the user selection criterion signalling to select one or more differing types of location service in the provision of location related data for the apparatus.

Allowing for use of the user selection criterion signalling to select one or more differing types of location service in the provision of location related data for the apparatus may comprise transmitting signalling to a third party device requesting the provision of location related data for the apparatus. The third party device may be a server, which may be remote from the apparatus.

The location service selection criterion signalling may represent one or more performance characteristics of the apparatus. The location service selection criterion signalling may also allow for user adjustment of one or more desired values for the performance characteristics, and the user selection criterion signalling may be representative of user input indicative of the one or more desired values for the performance characteristics. The method may further comprise processing the user selection criterion signalling and providing the user with revised location service selection criterion signalling in accordance with the user selection criterion signalling.

According to a further aspect, there is provided a computer program, which may be recorded on a carrier, the computer program comprising computer code configured to perform any method disclosed herein, or to configure any apparatus or device disclosed herein.

There may be provided a computer-readable storage medium having stored thereon a data structure comprising the computer program. The computer-readable medium may be transient, such as a signal, or may be a computer disc.

The computer program may be electronically distributed over one or more computer-readable storage media. In some embodiments, the computer program can be integrated with an operating system of device, for example the program can be part of S40, Maemo or S60 operating system. Alternatively, the computer program can be installed to a device, for example when the device is manufactured in a factory.

According to a further aspect, there is provided a method of assembling an apparatus, the apparatus comprising:
one or more processors configured to provide a user with location service selection criterion signalling, the location service selection criterion signalling allowing for user selection of one or more differing types of location service, each of the differing types of location service for the provision of location related data for the apparatus;
one or more inputs configured to receive user selection criterion signalling representative of user input responsive to said location service selection criterion signalling; and
one or more processors configured to allow for use of the user selection criterion signalling to select one or more differing types of location service in the provision of location related data for the apparatus.

According to a further aspect, there is provided a method of assembling a device, the device comprising an apparatus, the apparatus comprising:
one or more processors configured to provide a user with location service selection criterion signalling, the location service selection criterion signalling allowing for user selection of one or more differing types of location service, each of the differing types of location service for the provision of location related data for the apparatus;
one or more inputs configured to receive user selection criterion signalling representative of user input responsive to said location service selection criterion signalling; and
one or more processors configured to allow for use of the user selection criterion signalling to select one or more differing types of location service in the provision of location related data for the apparatus.

According to a further aspect, there is provided apparatus comprising:
one or more means for processing configured to provide a user with location service selection criterion signalling, the location service selection criterion signalling allowing for user selection of one or more differing types of location service, each of the differing types of location service for the provision of location related data for the apparatus;
one or more means for inputting configured to receive user selection criterion signalling representative of user input responsive to said location service selection criterion signalling; and
one or more means for processing configured to allow for use of the user selection criterion signalling to select one or more differing types of location service in the provision of location related data for the apparatus.

There may be provided apparatus comprising:
one or more inputs configured to receive data representative of location services;
one or more outputs configured to provide a display with location service selection criterion signalling representative of the location services;
one or more inputs configured to receive user selection criterion signalling representative of user input responsive to the location service selection criterion signalling; and
one or more processors configured to activate a location service in accordance with the user selection criterion signalling.

Any location service selection criterion signalling disclosed herein may represent one or more performance characteristics of the apparatus.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 1 illustrates apparatus according to an embodiment of the invention;

DESCRIPTION OF SPECIFIC ASPECTS/EMBODIMENTS

Figure 2A:
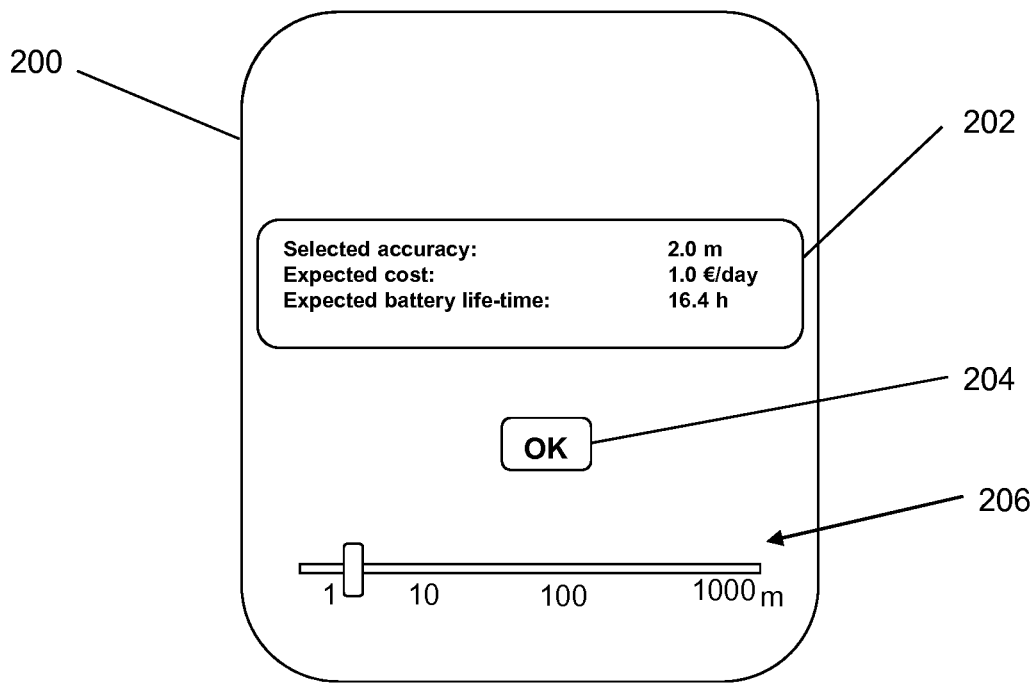
FIG. 2 illustrates a user interface according to an embodiment of the invention.

One or more embodiments described herein may provide an apparatus, user interface, or method that can provide a simplified presentation of one or more parameters/factors associated with a plurality of available location services. The parameters/factors can be presented to a user in a simplified manner such that the user can make an informed decision as to which of the plurality of location services should be utilised without requiring the technical knowledge of the specific location services. In this way, one or more embodiments can reduce user confusion when selecting which of a plurality of location services to use, and can simplify the cost and power variables in this assessment process.

FIG. 1 illustrates apparatus 100 according to an embodiment of the invention.

The apparatus 100 has one or more processors 102, a user interface 104, a first location service application 108 and a second location service application 110. It will be appreciated that one or more of the above components may be located on the same physical device, or they may be distributed over a network. In particular, one or both of the location service applications 108, 110 may be provided remotely from the user interface 104.

The one or more processors 102 may be configured to provide the user interface 104 with signalling 112 representative of one or more properties of the available location services: in this example the first location service application 108 and second location service application 110. The signalling 112 provided to the user interface 104 may be considered as location service selection criterion signal, and may cause the user interface to display information that allows a user to select one or more of the different types of location service 108, 110. The different types of location service 108, 110 are for the provision of location related data for the apparatus 100. In this embodiment, the user interface 104 is configured to display information by a graphical user interface, such as that illustrated in FIG. 2, although it will be appreciated that this information could be presented to a user in any other way.

The one or more processors 102 may have one or more inputs 116 configured to receive signalling 110 from the user interface 104. The signalling 110 is representative of user input responsive to the location service selection criterion signalling 108. The signalling that is received by the one or more processes 102 from the user interface 110 may be considered as user selection criterion signalling.

The one or more processors 102 are configured to allow for use of the user selection criterion signalling 110 to select one or more of the different types of location service provided by first location service application 108 and second location service application 110. It will be appreciated that any number of location services provided by any number of location service providers/applications can be used with embodiments of the invention.

The one or more processors 102 may allow for use of the user selection signalling in as much as the processors 102 send authentication signals to one or more of the location service applications 108, 110 requesting activation of that location service application 108, 110 if possible. In some embodiments one or more location service applications 108, 110 may change from being available to unavailable, and vice versa, over time, for example when environmental conditions associated with the apparatus 100 change. As an example, GPS signals may be lost when a device goes from being outside to being inside a building or a tunnel, and a GPS location service may no longer be available.

In other embodiments, one or more of the location service applications 108, 110 may be configured such that they provide location related data of the apparatus either immediately or at some future point in time.

In some embodiments, the location service selection criterion signalling 108 that is used to allow user selection of one or more different types of location service can cause one or more operational parameters of the location services 108, 110 to be displayed on the user interface 104. The operational parameters that are displayed to a user may be more meaningful than technical details to an average user, and may comprise information relating to typical power consumption/battery life associated with using a location service, the accuracy provided by a location service, the monetary cost associated with using a location service, for example. This simplification to a number of meaningful parameters, in some embodiments three parameters, can enable a user to be able to make an informed decision as to which of the location services to select and use.

It may be considered that the average user of such an apparatus 100 may not be familiar with one or more of the location services 108, 110 that are available to them, and in particular will not be familiar with the technical details of those location services, and how that relates to their usage apparatus 100.

In some embodiments, the invention can be seen to provide a dynamic location awareness profile, wherein a location awareness profile solution is generated from input received from a user, and in some examples no single (static) location awareness profile need be generated. In some embodiments, initial user input can be processed over time to dynamically adjust the location awareness profile that is being used in accordance with the user's input.

A location awareness profile may be considered as a set of instructions that can be performed by one or more of the processors 102 in order to activate/select one or more location services 108, 110. The location awareness profile may be relatively rigid once it has been defined, in that it allows for use of only a certain predefined combination of one or more of the location service applications 108, 110 until further user input is received, or may involve a more sophisticated algorithm that enables one or more of the location service applications 108, 110 to be utilised in a new or different way automatically in accordance with earlier user input 106.

The apparatus may be configured to receive user input representative of default instructions indicative of changes to the provision of location services that they are happy to be implemented without their specific input.

An example default setting may be that it is acceptable for an apparatus to automatically change the selection of the location service provider to improve the accuracy of the service as long as the monetary cost does not increase. An alternative default setting may be to automatically change to a location service provider that is less battery-intensive if the projected battery life drops below a threshold.

If a user does not set any accuracy for the location awareness, but just enables the profile, default values will be used. For example, the best possible accuracy with zero cost.

A location awareness solution may be provided for all environments, including changing environments.

In embodiments where a large variety of location technologies and use cases are available, the selection of the location technology/technologies for location awareness may not be self-evident to a user. If, for example, the user selects the location awareness profile from a profile menu of the handset it is unreasonable to assume that an average user could also select which location technologies will/should be used for the feature. Still, there might be use cases and uses that the user wishes to use and also make sure that location information, for example specific accuracy is always available.

Figure 2B:
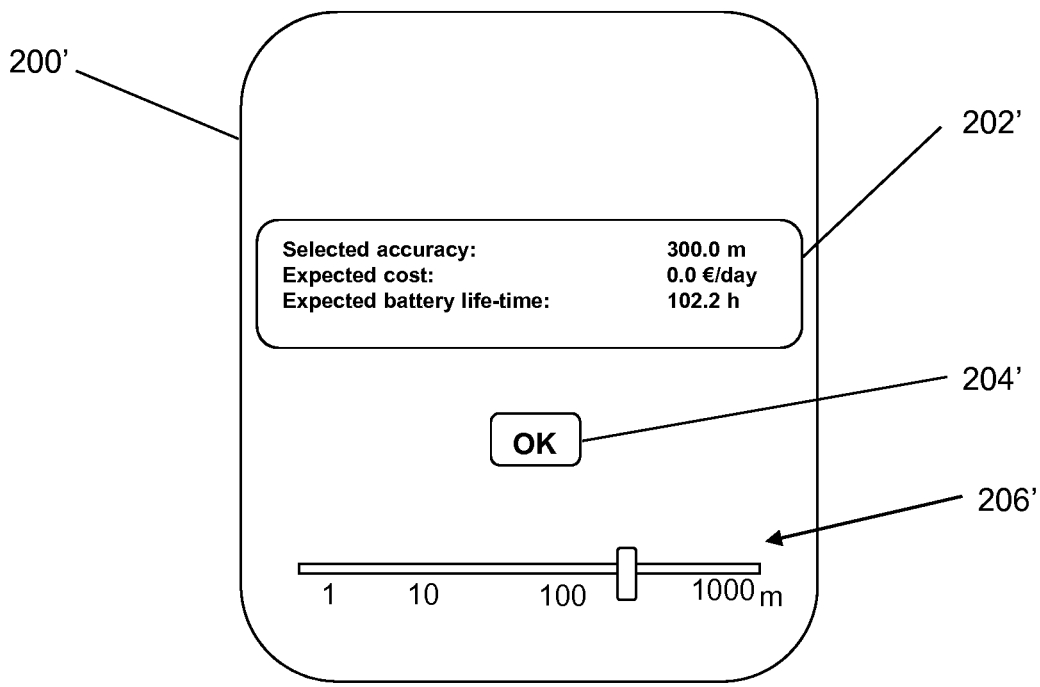
Figure 2C:
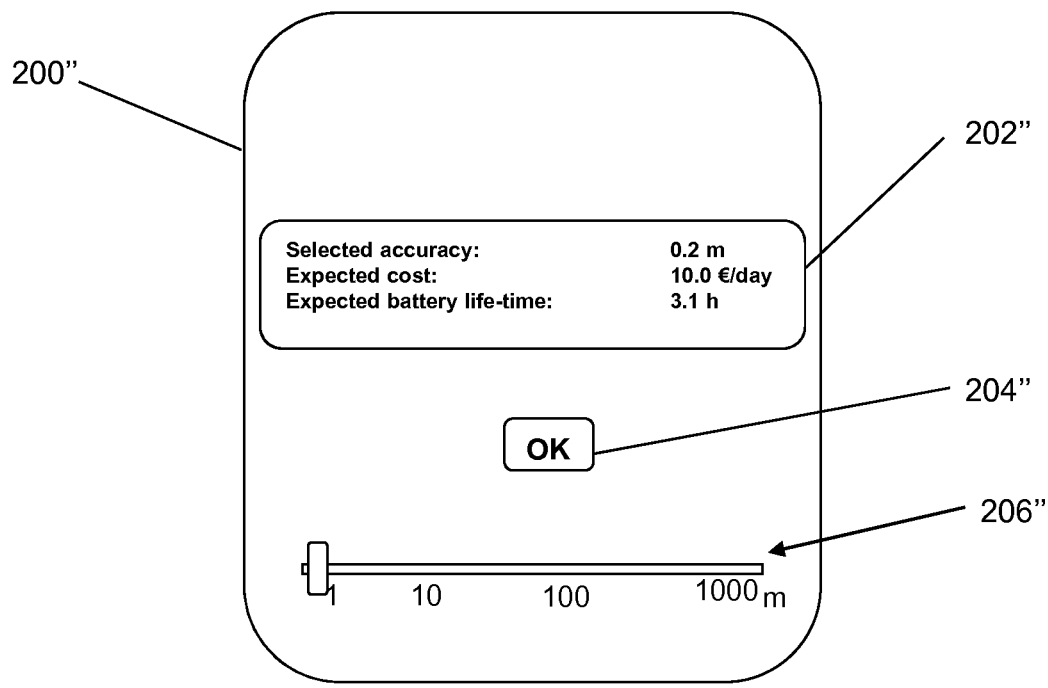

FIGS. 2A, 2B and 2C illustrate an embodiment of a user interface according to an embodiment of the invention. The user interface 200 comprises a user input slide bar/panel 206 that enables a user to set a required accuracy for their location service, an information panel 202 that provides parametric information associated with the user input on the slider 206, and an "ok" button 204 that a user can press to confirm their selection of the location services.

In the example of FIG. 2A, the user has selected an accuracy of 2 meters using the slide bar 206. As well as the selected accuracy, the display panel 202 also displays the expected cost for providing a location service with the requested accuracy, and an expected battery lifetime for using the location service. If the user is satisfied with the parameters displayed in the display panel 202, they can press the "ok" button 204 to allow for provision of the selected location services. In such an example, some use of A-GPS technology may be required to provide the necessary accuracy, and therefore there is an associated cost of 1 Euro per day for using this service, and the required power consumption will reduce the battery life to 16.4 hours. In this example there may be frequent use of GPS.

Alternatively, the user may select an accuracy of 300 metres as illustrated in FIG. 2B. In such an embodiment, there may be no cost associated with providing the location services, because available cell-based applications may be used. In this example, the location service may require infrequent assistance by GPS and this can keep the cost and power consumption down.

Cell-base location services/technologies may be able to provide accuracy in the range of 10 to 20 m to many kilometres. Cell-based technologies will be free of charge both in terms of monetary cost and additional processing resources. In addition, cell-based technologies may provide an easy handover between cells.

In a further example, FIG. 2C illustrates the parameters that are displayed on display panel 202" for a location service with a selected accuracy of 0.2 metres. Such a location service may be relatively expensive, such as 10 Euros per day, and may drastically reduce the expected battery lifetime down to 3.1 hours. This may be because carrier-phase GPS may be required continuously which can be expensive both in terms of data traffic and processing power.

It will be appreciated that as the user adjusts the accuracy on the slide bar 206, the values of the parameters that are displayed on the display panel 202 change accordingly so that a user can monitor the effect that changing the accuracy (or any other parameter or performance characteristic in other embodiments) has on the other parameters.

The functionality of the selection of one or more location services may be accessed by a user by running a "location service selection" application on a device associated with the apparatus 100, for example on a mobile telephone.

When the user opens the "location service selection" application, the one more processors retrieve the current parameters associated with the location services 108, 110 (and optionally any required information from memory, such as data indicative of charges associated with using the location services 108, 110), processes this information and then causes the location service selection criterion signalling to be sent to the user interface 104 to cause information to be displayed to a user as discussed above.

Once the user has made their selection in relation to the location related data that is required for example by clicking the "ok" button 204 shown in FIG. 2, the user interface may no longer display information that the user can use to select a location service. That is, the user interface associated with the "location service selection" application is no longer displayed.

Figure 2D:
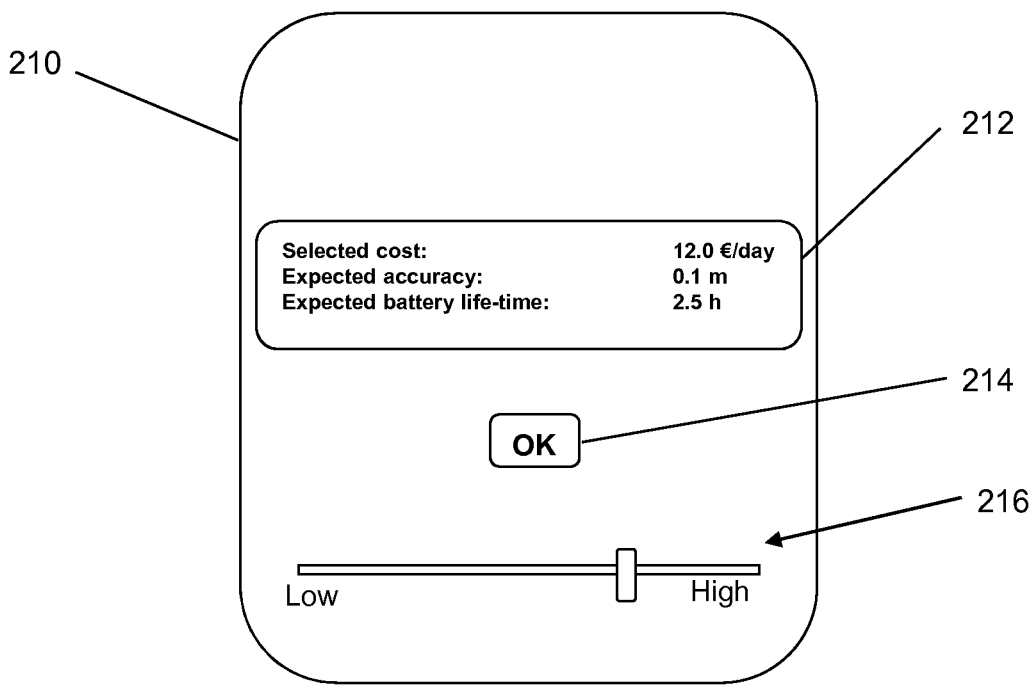

FIG. 2D illustrates an embodiment of a user interface 210 according to another embodiment of the invention. In this example, the user can adjust the value for the cost parameter in order to select one or more location services. In this example, the slider 216 is used by a user to select a price that they are willing to pay for the provision of location services. In this example, the slider 216 is marked with the range from "high" to "low", although in other examples, actual monetary values such as "12.0 Euros/day" may be associated with the slider 216.

Figure 2E:
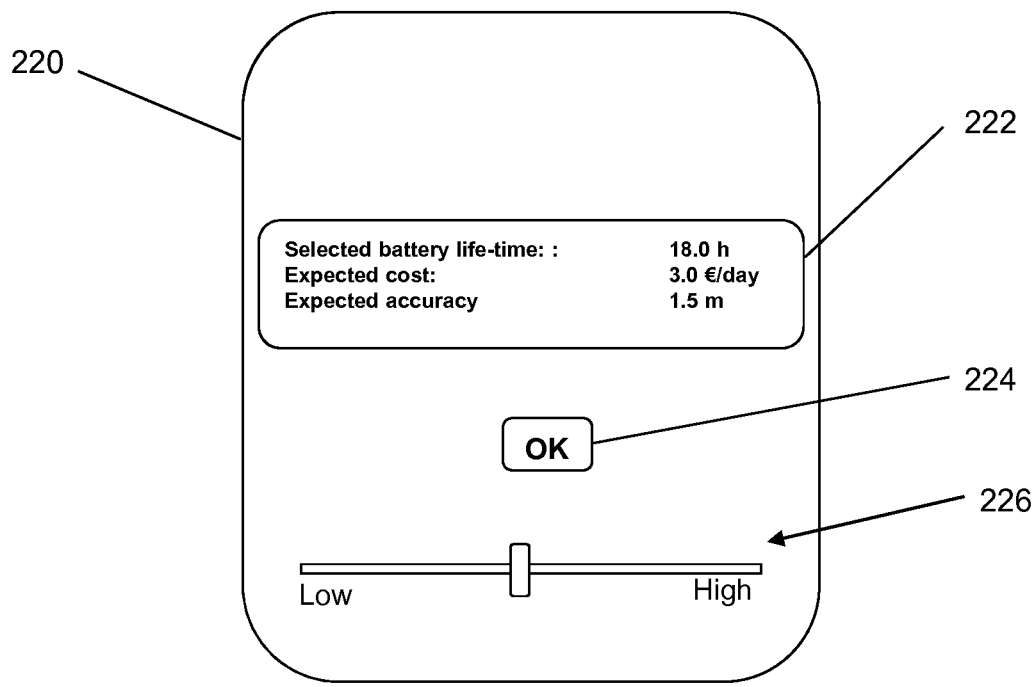

FIG. 2E illustrates an embodiment of a user interface 220 according to another embodiment of the invention. In this example, the user can adjust the value for the battery life-time parameter in order to select one or more location services. In this example, the slider 226 is used by a user to select the length of time a battery associated with the user interface 220 will last. This may be a convenient embodiment where a user knows that they are going to be on holiday for a weekend for example, and therefore can ensure that the battery does not run out whilst they are away. Again, in this example, the slider 216 is marked with the range from "high" to "low", although in other examples, actual periods of time such as "48.0 hours" may be associated with the slider 216.

A user may be able to select, for example by clicking on, any of the parameters displayed in the information panel 202, 212, 222 such that they can adjust the value of that parameter. In this example the value for the parameter is adjusted using the slider 206, 216, 226, although in other embodiments any other suitable user interface may be used.

The parameter that a user decides to adjust with the slider 206, 216, 226 may be selected depending on the user's anticipated next actions, as they could have differing priorities when making this decision/setting.

It will be appreciated that when a user adjusts a slider 206, 216, 226 or otherwise provides input representative of a desired value for a performance characteristic, the user interface/apparatus can cause signalling to be sent to one or more external devices in order to receive revised signalling representative of the information that is to be displayed to the user in light of the desired value. In other embodiments, it may not be necessary for the device/apparatus to communicate with an external device in order to be capable of displaying the desired information as the required signalling may be available locally.

Figure 2F:
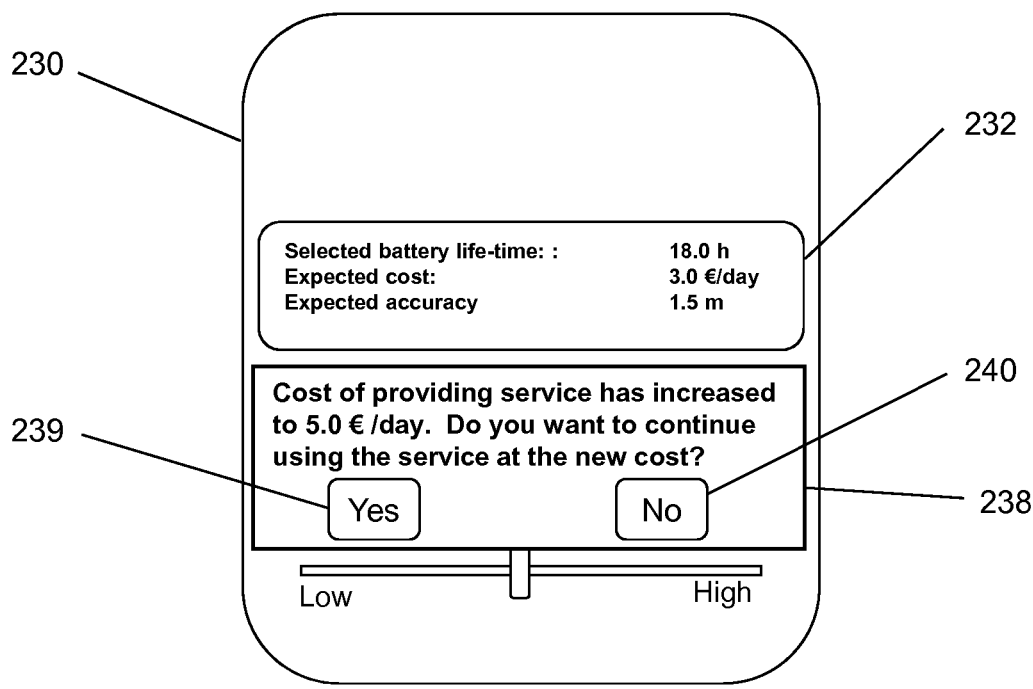

FIG. 2F illustrates a user interface 230 according another embodiment of the invention.

In this example, a user has previously selected a location service by using the user interface illustrated in FIG. 2E. However, after the provision of the location service, one or more of the performance parameters associated with the activated location service has changed. For example, one or more of the communication channels that were being used to provide the location service may have become unavailable, and therefore a different communication channel must be used in order to satisfy the user's requirements.

In this example, the different communication channel is more costly in terns of monetary value, and therefore a message 238 is displayed on the user interface 230 requesting that a user provides an input as to whether or not they want to continue using the location service at the new cost. The user can select a "Yes" option 239 to accept the new cost, or a "No" option 240 to reject the new cost. If the user selects the "No" option 240, they may be presented with any of the user interfaces illustrated as FIGS. 2A to 2E in order to select a new location service, or the location service may be cancelled completely.

Embodiments of the user interface (UI) for location awareness can allow the user to select the desired location accuracy for the needed uses/use cases. The UI application can automatically estimate the expected cost and battery life-time needed to fulfil the requested accuracy based on the capabilities of the handset and estimates for the network use. For example, if the user wants very coarse location information, the location awareness can be implemented using Cell-ID positioning which virtually consumes zero extra power and costs nothing. In a case the user wants sub-meter accuracy the location information can be produced only by using carrier-phase GPS positioning which not only require continuous use of GPS, but also continuous network assistance, which in turn will increase costs and power consumption.

In the example of FIG. 2, the UI does not present any means for the user to indicate a navigation mode, but in some embodiments such a selection can be made, for example in a navigation application. The information about the navigation mode (pedestrian, vehicle etc.) can be requested from the navigation application by the location awareness application. The UI might also include a number of other menu items to further allow the user to input more information about the expected use cases or uses. For example, accurate location services may be required if navigation is required for a pedestrian, as it is important that the pedestrian knows where they are on the street and is typically moving relatively slowly. In embodiments that are used for vehicle navigation, less accurate locations services may be acceptable.

In some embodiment, the apparatus can also have access to information whether the device is connected to a charger or to another external power source (USB etc.). In this case the UI can take this into account when calculating the accuracy and life-time estimates for the user.

It may be possible for a user to cause the user interface associated with the "location service selection" application to be displayed at any point in time by opening up the application, or selecting an icon associated with the application in order to review the parameters that relate to the in-use location service.

One or more problems that may be solved by embodiments of the invention can include: how to select which location technologies to use/are feasible/are required for location awareness; how to take the user input into account in the location technology selection; how to make sure that the user understands and is aware of the possible costs and consequences of setting/enabling location awareness or requiring certain level of accuracy.

Embodiments described herein can: augment a location awareness profile with a user interface that can inform the user about the expected cost, battery life-time and accuracy and also give the user a possibility to select the desired accuracy level or possibly even to indicate the mode of navigation (pedestrian, vehicle etc); hide the selection and use of the location technology for location awareness from the user; seamlessly use a variety of location technologies from high-accuracy sub-meter GPS/GNSS to very coarse cell-ID positioning; reduce or minimize the power consumption of the location awareness solution by allowing optimal selection of the used location technology, update rate, use of network assistance etc. and; provide a location awareness solution for all environments.

Furthermore, embodiments described herein may provide a user with control of the location awareness and can enable a user to set a desired level of accuracy for the location information. A user can be informed about the cost and power consumption; does not have to understand Location Technologies to be able to use the feature; and the apparatus can enable a location solution to have freedom to improve/optimize the use of the resources that it has available.

Figure 3:
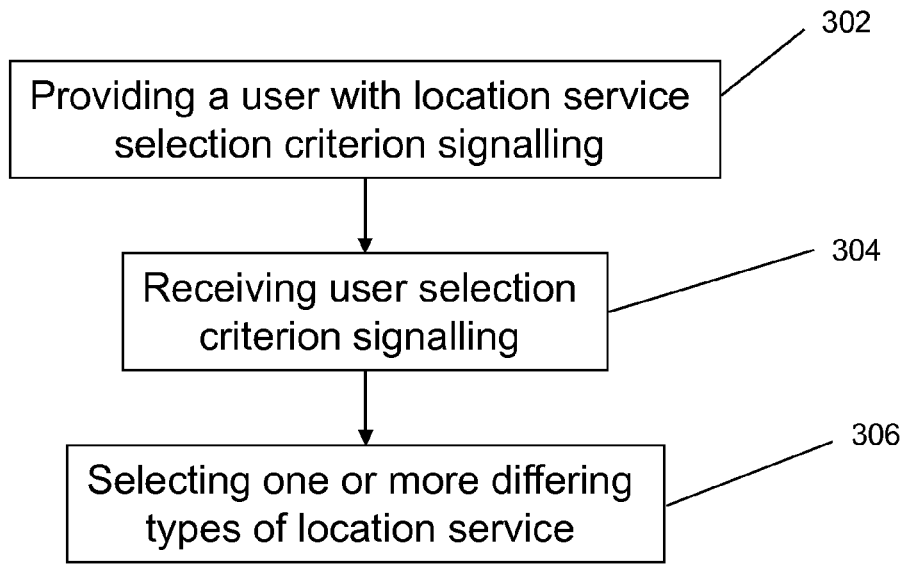
FIG. 3 illustrates schematically a method according to an embodiment of the invention.

FIG. 3 illustrates schematically a method according to an embodiment of the invention. In this embodiment, the method is for selecting one or more differing types of location service that can be used in the provision of location related data for an apparatus At step 302, the method comprises providing a user with location service selection criterion signalling. The location service selection criterion signalling allows for user selection of one or more differing types of location service, each of the differing types of location service for the provision of location related data for the apparatus.

The location service selection criterion signalling may be provided to a user interface, which causes information to be displayed to a user in accordance with the received signalling. The information that is displayed to the user may be representative of parameters associated with using the location services, rather than parameters representative of the location services themselves. For example, the name of the location service may not be displayed to a user, whereas, performance characteristics of the location service and/or performance characteristics of a device associated with the apparatus may be displayed to a user. In this way, a user can make an informed decision of which of the location services to use based on how that selection will effect the operation of the device.

At step 304, the method comprises receiving user selection criterion signalling representative of user input. The user selection criterion signalling represents user input responsive to the information displayed in accordance with the location service selection criterion signalling.

At step 306, the method comprises allowing for use of the user selection criterion signalling to select one or more differing types of location service in the provision of location related data for the apparatus. That is, one or more of the location services may be invoked, which may involve activating a location service application or requesting authentication to utilise location related data provided by a location service provider/application.

Embodiments described herein can use in built sensors of a device for extra options for determining a location of a device and differentiate between others having large variation of costs based on connection subscription, or cost derived data exchange options. Embodiments described herein can enable a user to not have to cope with this immensely technical array of decisions. Hence, a simplification to a number, in some examples three, parameters provides a meaningful basis for the user to be able to make an informed decision.

In some embodiments, the user may not be expected to control the use of the location technologies, but a location solution can independently and/or optimally use the resources for location awareness as long as the desired accuracy is guaranteed. For example, the use of carrier-phase GPS can be reduced/minimized if the user is not moving in which case motion sensors could be used to maintain location/position information. The change of the active location technology may not be shown to the user by the user interface.

In examples where a handset is connected to a power supply, the selection of the used location technologies may aim to increase/maximize the accuracy without adding any costs. In practise this could mean maximal use of GPS/GNSS. Once the power supply (e.g. charger) is disconnected, the selection may be changed automatically as power consumption will become a valid consideration again.

There might also be some other external factors that can be taken into account when displaying the available options to a user, and these can include factors that relate to an application program that will use the location related data.

In some embodiments, the best performance in terms of accuracy and power consumption can be obtained by combining two or more location services/technologies. A database of visited Cell-IDs, Wi-Fi Access Points (APs) etc. can be used by one or more of the processors for positioning, and may be complemented with GPS information. There may be no need to locate (position tag) each mobile telephony cell when the user enters cell, but the cells/access points could be position tagged as a group periodically. In examples where the location awareness does not require high-accuracy, this approach may be sufficient by providing a rather good estimate for the position all of the time.

Figure 4:
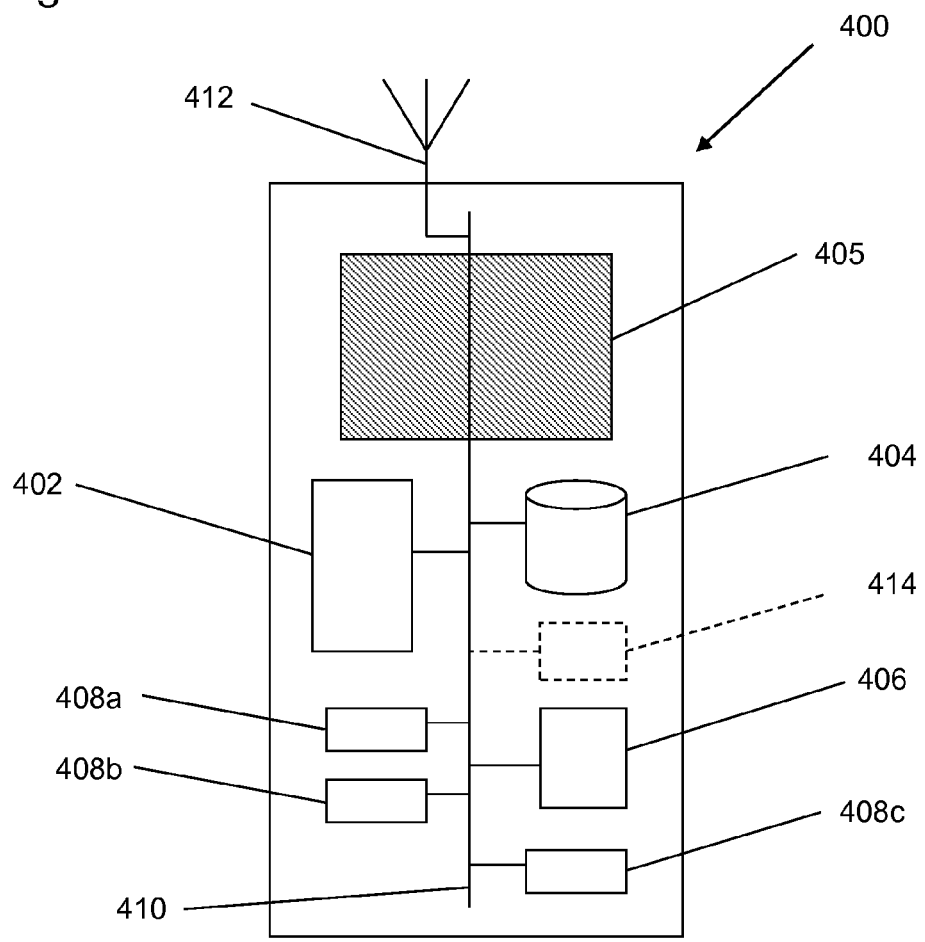
FIG. 4 illustrates a device according to an embodiment of the invention.

FIG. 4 illustrates a portable electronic device 400 according to an embodiment of the invention. In this embodiment, the device 400 is a mobile telephone.

The mobile telephone 400 comprises one or more processors 402, a memory 404, a display 405, a user interface driving circuit 406 and three location service application programs 408a, 408b, 408c, each of which are connected to a data bus 410. The mobile telephone also comprises an antenna 412.

The display can be used to display one or more of the user interfaces described herein.

In response to user input received by the user interface driving circuit 406, the one or more processors 402 are configured to select, and optionally activate immediately, one or more of the location service applications 408a, 408b, 408c for use in providing location services for the mobile telephone 400.

In some embodiments, a computer program, which may be embodied as software, can be loaded into the memory 404 of the device 400 such that it can be run by the one or more processors 402 in order to provide an embodiment of the invention. The computer program may be embodied on a disc, such as on memory 404 or on a portable memory device before it is loaded into the device 400. Alternatively, the computer program may be embodied on a transient signal, such as a short message service (SMS) message, or a download from the internet or any other network or device.

In some embodiments, software stored in memory 404 can be updated in accordance with information received by the device 400 over a wireless communication channel, or information received from a device and/or disc that is connected to the device 400 in some way.

The device 400 may be configured to receive information indicative of a change in the cost of providing a location service. For example, a location service provider may send information to the device 400 indicating one or more special offers that they are providing, and in some embodiments, the device 400 may be configured to pop-up a message to the user on the display 405 to provide information about the special offer to the user. In other embodiments, information received from a location service provider may be in relation to a new location service that they offer, or the termination of an existing location service that they used to offer.

In some embodiments, the device may also include a component 414 that is configured to monitor an operational state of the device 400 and provide signalling to the data bus 410 representative of the operational state of the device 400. The signalling can be used by the one or more processors 402 to provide a user with user location service criterion signalling, for example by providing the user interface driving circuit 406 with signalling that will cause a display screen 405 to display a number of options to a user. Alternatively or additionally, the signalling representative of the operational state of the device can be used by the one or more processors to automatically provision one or more of the location service applications 408a, 408b, 408c.

Examples of the operational state of the device 400 can include an indicator that the device's battery is running low, or when the device 400 is plugged into a charger. User input may be requested to confirm that the user wants to continue to use the location service currently in use or change to one or more different location services in light of the operational state change of the device.

It will be appreciated to the skilled reader that the apparatus/device/server and/or other features of particular apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor and/or on one or more memories/processors.

It will be appreciated that the aforementioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

With reference to any discussion of processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising one or more processors configured to:
provide, for display to a user of a portable electronic device, location service selection criterion signalling, the location service selection criterion signalling directly providing respective location determining accuracy values available to the portable electronic device and at least one other related performance characteristic value, the location service selection criterion signalling allowing for user selection of one or more differing types of location service, from at least two available differing types of location services, by selecting a desired location determining accuracy value, each of the differing types of location service for the provision of the location of the portable electronic device to the portable electronic device according to a respective location determining accuracy;
receive user selection criterion signalling representative of user input indicating selection of a revised desired value of location determining accuracy provided by the location service selection criterion signalling via a user interface of the portable electronic device;
process the user selection criterion signalling to cause display of the user-selected revised desired value of location determining accuracy and a revised value for the at least one other related performance characteristic corresponding to the revised desired value of location determining accuracy; and
select one or more of the differing types of location service, based on the user selection criterion signalling, in the determination of the location of the portable electronic device to the selected accuracy for provision of the determined location of the portable electronic device to the portable electronic device.

2. The apparatus according to claim 1, wherein the differing types of location service comprise one or more of: a global positioning system (GPS); assisted global positioning system; mobile telephony cell-based location services; wireless networking applications; high accuracy GPS; Global Navigation Satellite System (GNSS); and motion sensors.

3. The apparatus according to claim 1, wherein the location service selection criterion signalling represents operational parameters that are specific to a mode of operation of the portable electronic device, the portable electronic device being associated with the apparatus.

4. The apparatus according to claim 1, wherein the one or more processors are configured to select one or more differing types of location service by sending authentication to a location service provider.

5. The apparatus according to claim 1, wherein the apparatus is configured to provide the user with the location service criterion signalling when the operational status of a location service changes.

6. The apparatus according to claim 1, wherein the apparatus comprises one or more inputs configured to receive signalling representative of an operational state of the portable electronic device associated with the apparatus, and the one or more processors are configured to provide the user with the location service criterion signalling when the operational status of the device changes.

7. The apparatus according to claim 1, wherein the one or more processors are configured to change the selection of one or more differing types of location service in the provision of location related data for location determination if one or more parameters associated with the location service or the portable electronic device changes, wherein the portable electronic device is associated with the apparatus.

8. The apparatus according to claim 1, wherein the apparatus is the portable electronic device or a module for the portable electronic device.

9. The apparatus according to claim 1, wherein the apparatus comprises the user interface, the user interface having a display and one or more user inputs, the user interface configured to:
display the provided location service selection criterion signalling directly providing the respective location determining accuracy values available to the portable electronic device, and display the at least one other related performance characteristic value, on the display to enable user selection of the one or more differing types of location service;
receive user input responsive to said location service selection criterion signalling from the one or more user inputs indicating user-selection of a revised desired value of location determining accuracy provided by the location service selection criterion signalling; and
display the user-selected revised desired value of location determining accuracy and display the revised value for the at least one other related performance characteristic.

10. The apparatus of claim 9, wherein the user interface is a touch sensitive display screen.

11. The apparatus of claim 9, wherein the user interface is configured to display the range of available respective location determining accuracy values.

12. The apparatus according to claim 1, wherein the at least one other performance characteristic provided by the location service selection criterion signalling represents one or more of:
power consumptions of the portable electronic device for particular location services;
monetary values associated with use of the portable electronic device for particular location services;
battery life of the portable electronic device; and
a navigation mode of the portable electronic device.

13. The apparatus according to claim 1, wherein the apparatus is configured to transmit signalling to a third party device requesting the provision of the determined location of the portable electronic device to the portable electronic device according to the selected one or more of the differing types of location service.

14. A method of selecting one or more differing types of location service in the provision of the location of a portable electronic device, the method comprising:

providing, for display to a user of a portable electronic device, location service selection criterion signalling, the location service selection criterion signalling directly providing respective location determining accuracy values available to the portable electronic device and at least one other related performance characteristic value, the location service selection criterion signalling allowing for user selection of one or more differing types of location service, from at least two available differing types of location services, by selecting a desired location determining accuracy value, each of the differing types of location service for the provision of the location of the portable electronic device to the portable electronic device according to a respective location determining accuracy;

receiving user selection criterion signalling representative of user input indicating selection of a revised desired value of location determining accuracy provided by the location service selection criterion signalling via a user interface of the portable electronic device;

processing the user selection criterion signalling to cause display of the user-selected revised desired value of location determining accuracy and a revised value for the at least one other related performance characteristic corresponding to the revised desired value of location determining accuracy; and selecting one or more of the differing types of location service, based on the user selection criterion signaling, in the determination of the location of the portable electronic device to the selected accuracy for provision of the determined location of the portable electronic device to the portable electronic device.

15. The method of claim 14, wherein selecting the one or more of the differing types of location service, based on the user selection criterion signaling, in the determination of the location of the portable electronic device comprises transmitting signalling to a third party device requesting the provision of the location of the portable electronic device to the portable electronic device.

16. A computer program product comprising a non-transitory computer-usable medium having a computer program recorded thereon, the computer program comprising computer executable program code, which when executed by at least one processor of an apparatus, causes the apparatus to:

provide, for display to a user of a portable electronic device, location service selection criterion signalling, the location service selection criterion signalling directly providing respective location determining accuracy values available to the portable electronic device and at least one other related performance characteristic value, the location service selection criterion signalling allowing for user selection of one or more differing types of location service, from at least two available differing types of location services, by selecting a desired location determining accuracy value, each of the differing types of location service for the provision of the location of the portable electronic device to the portable electronic device according to a respective location determining accuracy;

receive user selection criterion signalling representative of user input indicating selection of a revised desired value of location determining accuracy provided by the location service selection criterion signalling via a user interface of the portable electronic device;

process the user selection criterion signalling to cause display of the user-selected revised desired value of location determining accuracy and a revised value for the at least one other related performance characteristic corresponding to the revised desired value of location determining accuracy; and select one or more of the differing types of location service, based on the user selection criterion signaling, in the determination of the location of the portable electronic device to the selected accuracy for provision of the determined location of the portable electronic device to the portable electronic device.

\* \* \* \* \*